United States Patent [19]

Watanabe et al.

[11] Patent Number: 4,946,345
[45] Date of Patent: Aug. 7, 1990

[54] TURBO-MOLECULAR PUMP

[75] Inventors: Katsuhide Watanabe; Satoshi Inanaga, both of Kanagawa, Japan

[73] Assignees: Ebara Research Co., Ltd., Fujisawa; Ebara Corporation, Tokyo, both of Japan

[21] Appl. No.: 324,514

[22] Filed: Mar. 16, 1989

[30] Foreign Application Priority Data

Mar. 18, 1988 [JP] Japan .................. 63-63403

[51] Int. Cl.⁵ .............................. F01D 1/36
[52] U.S. Cl. .................... 415/90; 415/119; 74/574; 188/379
[58] Field of Search .............. 415/90, 119; 188/378, 188/379, 380; 74/573 R, 574

[56] References Cited

U.S. PATENT DOCUMENTS

| | | | |
|---|---|---|---|
| 4,023,920 | 5/1977 | Bachler et al. | 417/354 |
| 4,293,136 | 10/1981 | George | 74/574 |
| 4,596,158 | 6/1986 | Strugach | 74/574 |
| 4,800,306 | 1/1989 | Oberto | 188/379 |

FOREIGN PATENT DOCUMENTS

| | | | |
|---|---|---|---|
| 73643 | 4/1984 | Japan | 188/380 |
| 62-184224 | 8/1987 | Japan . | |

Primary Examiner—Edward K. Look
Assistant Examiner—John T. Kwon
Attorney, Agent, or Firm—Armstrong, Nikaido, Marmelstein, Kubovcik & Murray

[57] ABSTRACT

The present invention provides a turbo-molecular pump in which an exhaust action is achieved by virtue of the combination of stationary blades and rotor blades adapted to rotate at high speed and to cooperate with each other to impart momentum to gaseous molecules rushing in against the blades under an extremely low-pressurized condition. Disposed inside the casing are a fixed shaft and the rotor, the latter being movably supported by a pair of active radial magnetic bearings. A motor is interposed between said pair of magnetic bearings. A dynamic damper is provided at one end of the fixed shaft to inhibit the occurrence of vibrations.

6 Claims, 5 Drawing Sheets

VIBRATION MODE $W_0$ : NATURAL FREQUENCY

TURBO-MOLECULAR PUMP

BACKGROUND OF THE INVENTION

The present invention relates to a turbo-molecular pump.

Turbo-molecular pumps are known wherein an exhaust action is effected by virtue of the combination of stationary blades and rotor blades adapted to rotate at high speed, the both the blades being adapted to cooperate with each other to impart momentum to gaseous molecules rushing in against the blades under a low-pressurized condition wherein the incidence of collisions between gaseous molecules is negligible.

The adoption of magnetic bearings in such a turbo-molecular pump enables non-contact support of the rotating shaft of the pump, and thus the life of the bearing can be beneficially made semipermanent.

Referring to FIG. 5, a prior art turbo-molecular pump having magnetic bearings will now be described. A fixed shaft 2 is provided in a casing 1, and a rotor 3 is placed over the shaft 2. Stator blades 4 are provided on the inner wall of the casing 1.

The fixed shaft 2 is provided thereon with active radial magnetic bearings 5, 5 and a motor 6, by means of which the rotor 3 can rotate at high speed in a non-contact manner. In FIG. 5, reference numerals 7, 7 respectively, denote touch-down bearings adapted to mechanically support the rotor 3 in case of failure of the magnetic bearings 5 and a rotor cover fixed to the rotor 3.

In a turbo-molecular pump of the type described above, vibrations caused by the residual unbalance that subsists during rotation, torque generated by the motor 6, shocks exerted on the casing 1 and so on disturb the control system of the magnetic bearings 5 as disturbance. And thus these disturbances act to vibrate the fixed shaft 2 at the natural frequency of the fixed shaft 2 so vibrated sometimes generates bending vibrations in the fixed shaft itself, which is shaped like a cantilever fashion, as shown in FIG. 6. The relationship between the amplitude and forced frequency ratio of these bending vibrations is shown in FIG. 7, and a simplified model of this structural system can, as shown in FIG. 8, be defined as having one degree of freedom.

These vibrations can constitute an adverse factor that makes the control system unstable, and self-excited or forced vibrations are sometimes generated in the pump main body. This serves to generate excessive vibrations in the pump main body and then to make it impossible for the magnetic bearings 5, 5 to support the rotor 3 in a stable manner, the functional reliability of the turbo-molecular pump thus being lowered.

The present invention has been contrived to solve the above stated drawbacks inherent to prior art pumps, and an object thereof is to provide a turbo-molecular pump that generates a reduced level of vibration during operation and that is reliable in functional terms.

SUMMARY OF THE INVENTION

In accordance with the present invention, a turbo-molecular pump having inside its casing a fixed shaft and a rotary member placed over this fixed shaft is provided with a pair of active radial magnetic bearings for movably supporting the rotating member, a motor interposed between the pair of active radial magnetic bearings and a dynamic damper disposed at one end of the fixed shaft.

In the practice of the present invention, the dynamic damper includes a weight and a resilient member which acts as spring and damping components. The weight is preferably made in the form of a ring and of a material having great mass ratio and specific gravity (for instance, tungsten) in order to minimize the size thereof as well as to maintain the amplitude of the fixed shaft at as low a level as possible. The resilient member is interposed between the ring-shaped weight and the fixed shaft and is preferably made of a rubber having low temperature dependency (for instance, an EPT or fluorine system rubber).

In order to adjust the dynamic damper to its optimum state, the spring constant of the resilient member adapted to act as a spring is preferably determined by giving consideration to such factors as the characteristics and size of the resilient member and the mass of the weight so that it constitutes a natural frequency estimated to be the optimum one on the basis of the mass ratio. This spring constant may be selected in such a manner that two fixed points through which the amplitude curve passes independently of damping become equal in height. The hardness of the resilient member regulates the damping capability of the dynamic damper, and the hardness is preferably selected to be such that the amplitude curve passes through a maximum value at the two fixed points. It should be noted, however, that the spring constant should be prevented from deviating from the optimum natural frequency of the dynamic damper since the hardness of the resilient member also has an effect on the spring constant.

A dynamic damper having a spring constant defined as described above allows the amplitude curve of the structural system of the present invention to have its maximum amplitude points at the two fixed points, thus making it possible to hold the amplitude of resonance to a minimum level.

With the turbo-molecular pump of the present invention configured as described above, a rotary member can be supported in a non-contact manner and hence can be rotated at high speed by means of the active radial magnetic bearings provided on the pump. In addition, in the present invention, the dynamic damper is mounted on one end of the fixed shaft, and this enables a simplified model of the structural system to be defined as having two degrees of freedom, thus making it possible to hold the amplitude of the natural frequency of the fixed shaft to a remarkably low level. With this configuration, the rotary member can be stably supported by the magnetic bearings, and furthermore, adverse factors that would act on the control system of the magnetic bearings can be eliminated, thus making it possible to provide a turbo-molecular pump which generates almost no vibration during operation.

DESCRIPTION OF THE PREFERRED EMBODIMENTS

Figure 1:
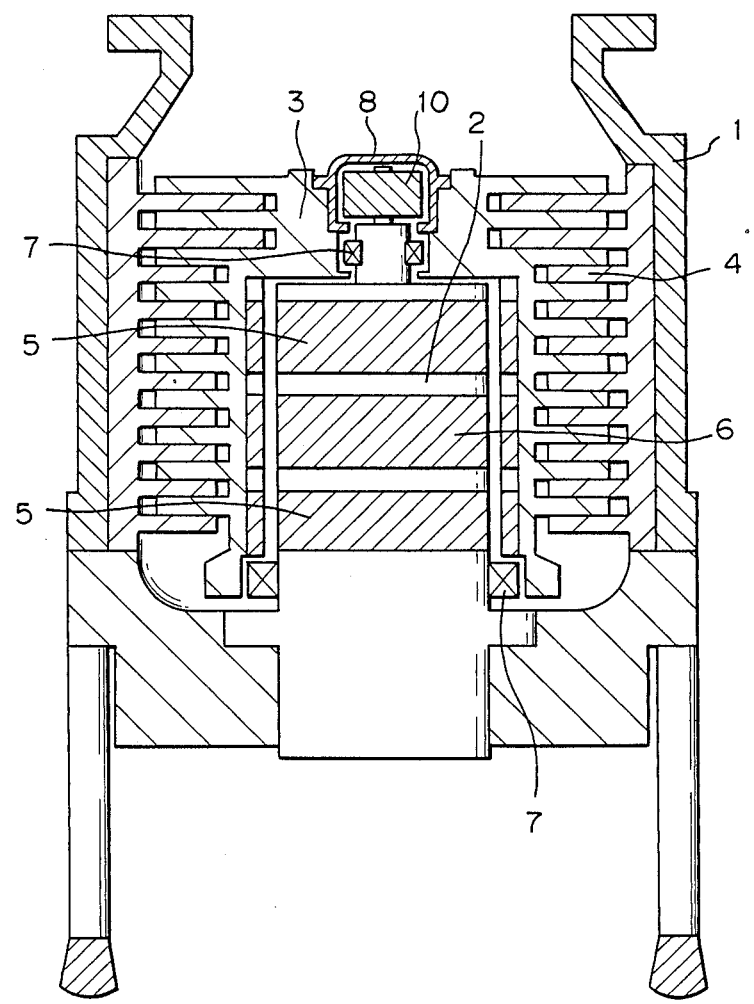
FIG. 1 is a front view in section showing one embodiment of the present invention.
Figure 5:
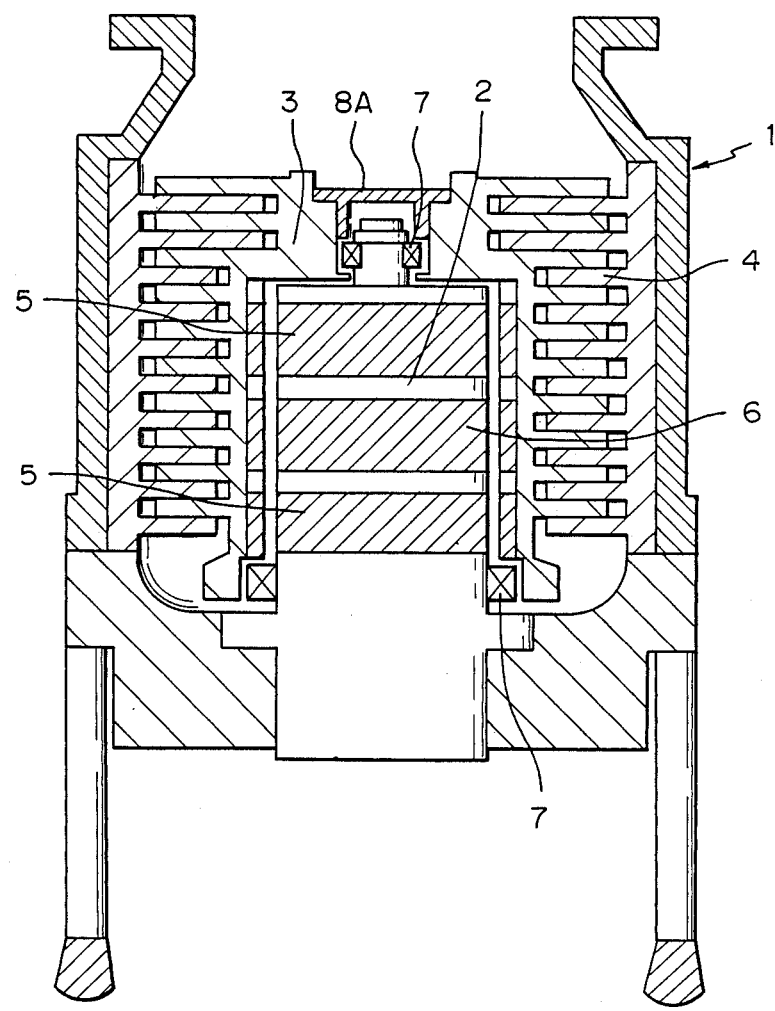
FIG. 5 is a front view in section showing a prior art turbo-molecular pump.
Figure 6:
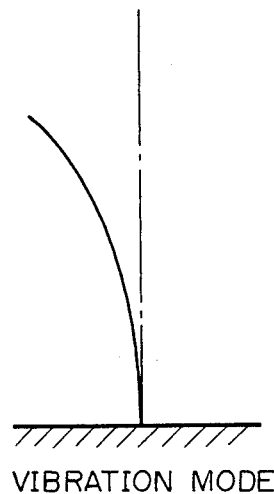
FIG. 6 is a diagram showing a mode in which bending vibrations are generated in the fixed shaft of the prior art turbo-molecular pump.
Figure 8:
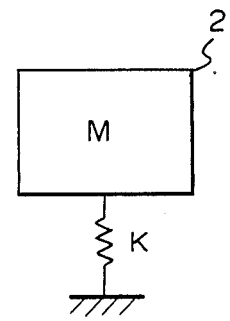
FIG. 8 is a diagram showing the simplified model of the structural system according to the prior art.
Figure 7:
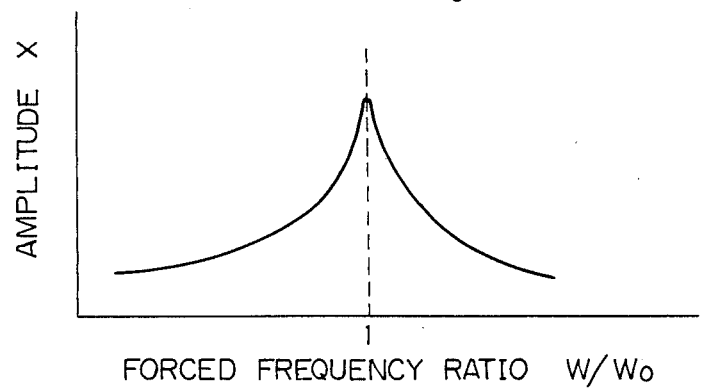
FIG. 7 is a characteristic diagram of amplitude/frequency ratio resulting in the mode shown in FIG. 6.

A preferred embodiment of the present invention will now be described with reference to the accompanying drawings. In FIG. 1, like reference numerals are used to denote constituent members that are like those shown in FIG. 5.

As shown in FIG. 1, disposed on the upper end portion of a fixed shaft 2 is a dynamic damper 10, which is covered by a rotor cover 8.

Figure 2:
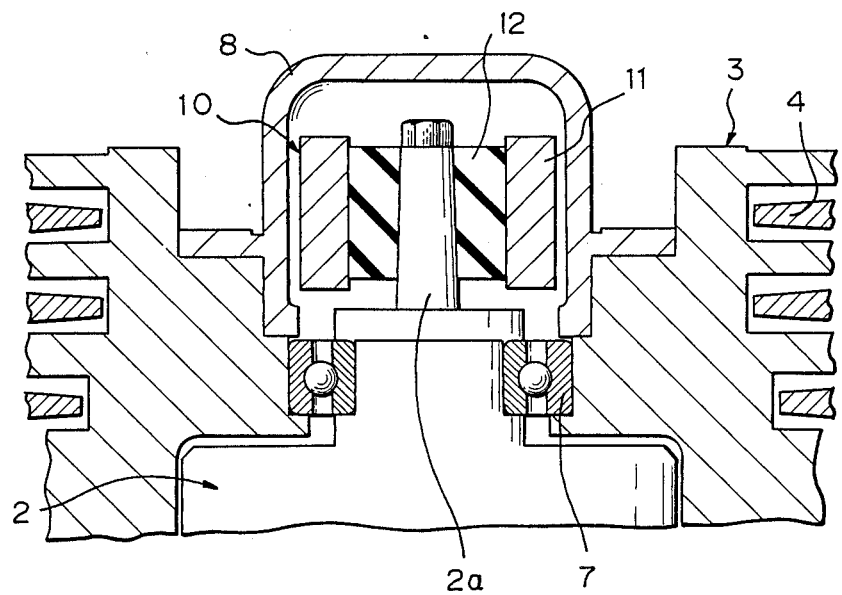
FIG. 2 is a front view in section showing in detail the dynamic damper.

As shown in FIG. 2, the dynamic damper 10 comprises a ring-shaped weight 11 and a ring-shaped rubber member 12 which is secured to the weight 11 and interposed between the weight 11 and a spindle 2a projecting from the end portion of the fixed shaft 2.

This weight 11 is made of a material, for instance, tungsten, which has great mass ratio and specific gravity in order that it can hold the amplitude of the fixed shaft 2 to as a low level as possible and also so as to minimize its size. The rubber member 12 is made of an EPT or fluorine system rubber which has low temperature dependency. The spring constant and damping capability of the dynamic damper 10 is regulated not only by the size but also by the hardness of the rubber used for the rubber member 12, and the hardness of the rubber is therefore so selected that the two fixed points P and Q on the amplitude curve become equal in height in its optimum state and that the amplitude curve passes through a maximum value on these two fixed points P and Q in the same state.

Figure 4:
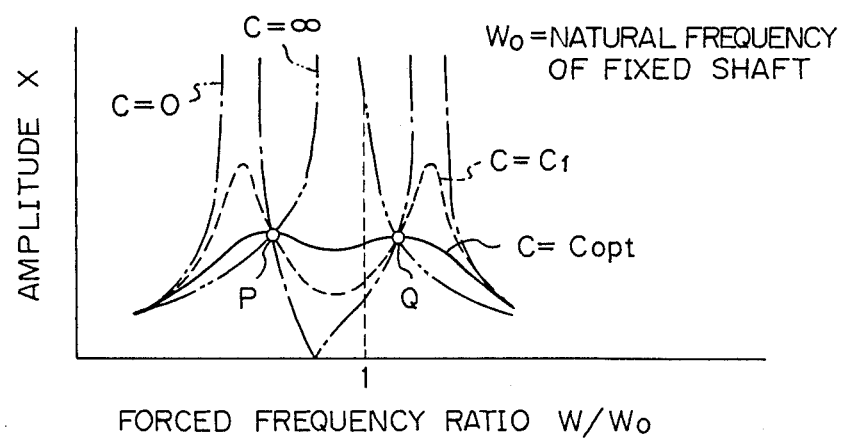
FIG. 4 is a characteristic diagram of amplitude/frequency ratio showing advantageous effects of the present invention.
Figure 3:
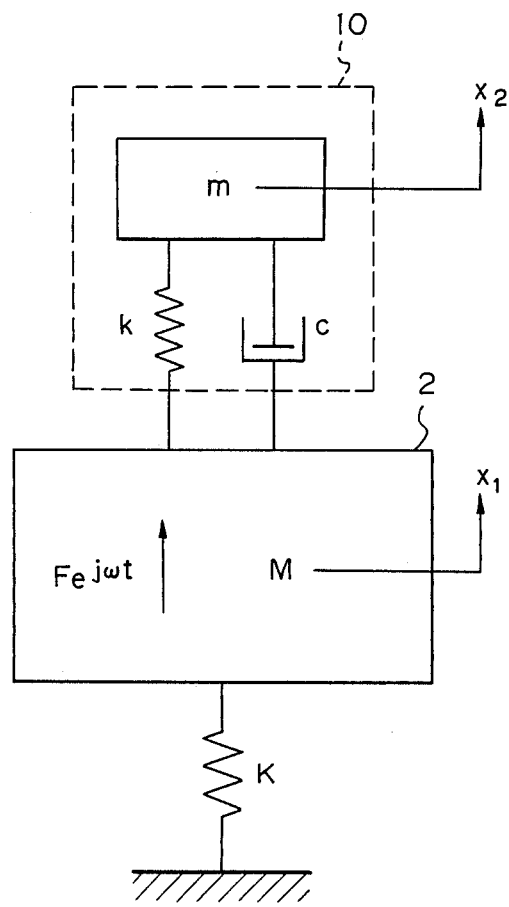
FIG. 3 is a diagram showing a simplified model of the structural system of the present invention.

A simplified model of the structural system of the turbo-molecular pump equipped with a dynamic damper configured as described above is, as shown in FIG. 3, defined as having two degrees of freedom, and the relationship between its amplitude and forced frequency ratio becomes as shown in FIG. 4. As clear from FIG. 4, the fixed points P and Q correspond to the maximum amplitude point of the amplitude curve, thus making it possible to hold resonance of the structural system to as a low level as possible.

With the present invention configured as described above, the rotor can be stably supported in a non-contact manner by the magnetic bearings. Moreover, the amplitude of the fixed shaft can made remarkably be low, and generation of self-excited and forced vibrations during high-speed rotation can in turn be prevented. Thus, the present invention provides a turbo-molecular pump which generates a reduced level of vibration and is hence highly reliable.

What is claimed is:

1. A turbo-molecular pump comprising a casing (1), a fixed static shaft (2) fixed inside of said casing, a rotor (3) placed over said fixed static shaft (2), a pair of active radial magnetic bearings (5, 5) provided at said fixed shaft for movably supporting said rotor (3), a motor (6) disposed between said pair of active radial magnetic bearings (5, 5), said magnetic bearings being symmetric with respect to a longitudinal axis of said fixed static shaft, said fixed static shaft generating only a bending vibration when activated, and a dynamic damper (10) provided at one end of said fixed static shaft (2), wherein said dynamic damper (10) comprises a ring-shaped weight (11) disposed in such a manner as to surround a spindle (2a) mounted at one end of said fixed static shaft (2) and a ring-shaped resilient member secured between said weight (11) and spindle (2a) and further wherein said dynamic damper has a predetermined natural frequency of a bending vibration so as to substantially eliminate said bending vibration of said fixed static shaft.

2. Turbo-molecular pump according to claim 1, wherein one end of said fixed static shaft (2) is connected to one end of said cylindrical casing (1) in a manner such that the other end is a free end, touch-down bearings (7) for mechanically supporting said rotor (3) in case of failure of said magnetic bearings (5, 5) are provided on, said fixed static shaft (2) at a position close to the free end and supported end thereof, and said dynamic damper (10) is provided at the free end of said fixed static shaft (2).

3. A turbo-molecular pump according to claim 1, wherein one end of said fixed static shaft (2) is connected to one end of said cylindrical casing (1) in a manner such that the other end is a free end, said dynamic damper (10) is provided at the free end of said fixed static shaft (2), saids rotor (3) is formed to surround said fixed static shaft (2), said rotor (3) is provided with a rotor cover (8) for covering said dynamic damper (10) and a row of rotary blades which are axially spaced from each other and each extend radially outwardly from said fixed static shaft, and a row of stationary blades are provided within the inside of said cylindrical casing (1) in a manner such that each said stationary blade extends into a space formed between adjacent two of said row of rotary blades.

4. A turbo-molecular pump according to claim 1, wherein said resilient member (12) is in direct contact with said spindle (2a).

5. A turbo-molecular pump in which an exhaust action is effected by imparting momentum to gaseous molecules under an extremely low-pressurized condition, said pump comprising:
   a cylindrical casing (1);
   a fixed static shaft (2) located inside said cylindrical casing (1), one end of said fixed static shaft (2) being connected to one end of said cylindrical casing (1) in a manner such that the other end is a free end;
   a cylindrical rotor (3) formed to surround said fixed static shaft (2);
   a pair of active radial magnetic bearings (5, 5) which allow said rotor (3) to rotate about said fixed static shaft (2) at high speed and in a non-contact manner, said magnetic bearings being symmetric with respect to a longitudinal axis of said fixed static shaft, wherein said fixed static shaft generates only a bending vibration when activated;
   a pair of touch-down bearings (7) provided on said fixed static shaft (2) at a first position close to the free end thereof and at a second position close to the supported end thereof for mechanically supporting said rotor in case of failure of said magnetic bearings.
   a dynamic damper (10) comprising a ring-shaped weight (11) surrounding a spindle (2a) provided at the free in of said fixed static shaft (2) and a ring-shaped resilient member (12) secured to said weight (11) and interposed between said weight

(11) and said spindle (2a), said dynamic damper having a predetermined natural frequency of a bending vibration so as to substantially eliminate a bending vibration of said fixed static shaft;

a rotor cover (8) for closing one end of said cylindrical rotor (3) and covering said dynamic damper (10);

a row a rotary blades provided over said rotor (3) and axially spaced from each other, each of said rotary blades extending radially outwardly; and a row of stationary blades provided within the inside of said casing in a manner such that each extends into a space formed between adjacent two of said row of rotary blades.

6. A turbo-molecular pump according to claim 5, wherein said resilient member (12) is in direct contact with said spindle (2a).

* * * * *